United States Patent [19]

Ito et al.

[11] Patent Number: 4,933,050

[45] Date of Patent: Jun. 12, 1990

[54] PROCESS FOR PRODUCING A PLANAR DIMMER

[75] Inventors: Toshiyasu Ito; Jun Minoura; Takaaki Mori; Shigeyuki Takahashi; Mamoru Kato; Junichi Shimada; Fujio Hayakawa, all of Aichi, Japan

[73] Assignee: Toyoda Gosei Co., Ltd., Nishikasugai, Japan

[21] Appl. No.: 387,836

[22] Filed: Aug. 1, 1989

Related U.S. Application Data

[62] Division of Ser. No. 173,594, Mar. 25, 1988.

[30] Foreign Application Priority Data

Mar. 31, 1987 [JP] Japan ............................ 62-49746
Apr. 28, 1987 [JP] Japan ............................ 62-64626

[51] Int. Cl.$^5$ ............................................. C23C 28/00
[52] U.S. Cl. ........................................ 204/15; 204/30; 204/38.1; 204/38.4; 427/108; 427/286
[58] Field of Search .............. 204/15, 30, 38.1, 38.4; 427/98, 108, 286

[56] References Cited

U.S. PATENT DOCUMENTS

| | | | |
|---|---|---|---|
| 4,636,799 | 1/1987 | Kubick | 350/355 X |
| 4,660,939 | 4/1987 | Tsuchiya et al. | 350/357 |
| 4,664,934 | 5/1987 | Ito et al. | 427/38 |
| 4,750,816 | 6/1988 | Ito et al. | 350/357 |

Primary Examiner—John F. Niebling
Assistant Examiner—William T. Leader
Attorney, Agent, or Firm—Cushman, Darby & Cushman

[57] ABSTRACT

A process for producing planar dimmer comprising a transparent base, a dimming part, capable of dimming, disposed on the base, the dimming part comprising a first electrode layer formed on the base, a second electrode layer set facing the first electrode layer, a coloring part, disposed between the two electrode layers, and colors or discolors in response to the stimulus from the two electrode layers, and a conducting part disposed between the base and the first electrode layer in such a way as to be in contact with the first electrode layer in order to apply a uniform voltage throughout the first electrode layer.

The process includes forming paint stripes, electrolessly plating a metal film over each of the stripes, forming an electrode layer over the metallized stripes, and forming a color-forming layer over the electrode layer.

3 Claims, 3 Drawing Sheets

PROCESS FOR PRODUCING A PLANAR DIMMER

This is a division of application Ser. No. 07/173,594, filed Mar. 25, 1988.

FIELD OF THE INVENTION

The present invention relates to electrochromic elements used in various types of displays and planar dimmers, and specifically to planar dimmers using electrochromic elements with large areas.

DESCRIPTION OF THE RELATED ART

An electrochromic element, comprising an oxidative color-forming layer and a reductive color-forming layer inserted between a pair of electrodes, is an element that is capable of coloring and discoloring as a result of electrochemical redox reaction.

One type of planar dimmer using this electrochromic element is shown in FIG. 10(a) and FIG. 10(b), known as the all-solid type. This has a transparent base 41 and on top of it, consecutively piled together, a transparent electrode 42, a color-forming layer 43, an electrolyte 44, a color-forming layer 45, and another electrode 46, with parts 47a, 47b on the electrodes 46, 42 respectively for connecting lead wires. This device is of the type where a pair of bases 41 are piled consecutively, on top of one another. One of the bases has a transparent electrode 42 and an oxidative color-forming layer 43 thereon, and the other a transparent electrode 42 and a reductive color-forming layer 45 thereon. These bases are prepared and, between the color-forming layers an electrolyte 44, which can be either a solution, a gel or a solid, is inserted.

In planar dimmers where this type of electrochromic element was used, when the area of the electrochromic element was large, on coloring or discoloring, a problem arose with regard to the responses of the oxidative color-forming layer 43 and the reductive color-forming layer 45. In other words, because the plate resistances of the transparent electrodes 42, 46 are high, when voltage was applied, coloring or discoloring did not occur quickly and evenly throughout the electrochromic element. Coloring or discoloring occured gradually, starting from the part where the voltage was applied. This kind of coloring or discoloring process of the color-forming layers was not considered impressive or acceptable.

Besides, in the planar dimmer using the electrochromic element mentioned above, when the area of the element is large, due to an excessive amount of current being supplied to the area near the lead wire connectors 47a, 47b along the circumference of the transparent electrodes 42, 46, these parts near the lead wire connectors 47a, 47b easily deteriorate.

SUMMARY OF THE INVENTION

An objective of the present invention is to provide a planar dimmer that has excellent dimming qualities and can color and discolor throughout, quickly and evenly.

One other objective of the present invention is to provide a planar dimmer whose clarity or visibility is not impaired.

One other objective of the present invention is to provide a planar dimmer with a long lifetime, where there is no excessive supply of current along the circumference of the electrode layers.

One other objective of the present invention is to provide a method of manufacturing a planar dimmer wherein the electroless plating method employed in forming a metal film can be effectively performed.

A further objective of the present invention is to provide a planar dimmer with improved durability as a result of strengthening the adhesiveness of the electrode layer to the base.

In order to realize the objectives mentioned above, the present invention comprises a transparent base, a dimming means, capable of dimming, disposed on top of the base, the dimming means comprising a first electrode layer disposed on top of the base, a second electrode layer set facing the first electrode layer, and a coloring means, which colors or discolors in response to the stimulus from the electrode layers, disposed between these two electrode layers, and a conducting means, located between the base and the first electrode layer, disposed in such a way as to be in contact with the first electrode layer so that a uniform voltage is applied throughout the first electrode layer.

Other objectives of the present invention will become apparent with an understanding of the embodiments described later and the appended claims. Further, many advantages not mentioned in this specification will become obvious to one skilled in the art upon application of the present invention.

BRIEF DESCRIPTION OF THE DRAWINGS

FIG. 1 is a partial horizontal sectional view of a planar dimmer using an electrochromic element, FIG. 2 is a partially broken plane view of a planar dimmer.

DETAILED DESCRIPTION OF THE PREFERRED EMBODIMENTS

A detailed description of the first embodiment of the planar dimmer, using an electrochromic element, of the present invention will be given hereafter with reference to FIG. 1 and FIG. 2.

Figure 1:
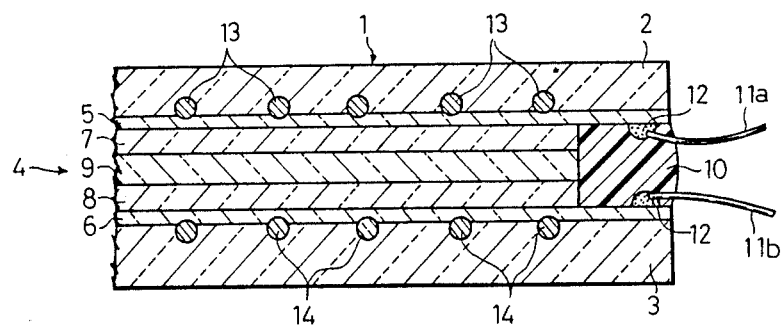
FIG. 1 and FIG. 2 show a first embodiment of the present invention.

As shown in FIG. 1, the planar dimmer comprises a pair of transparent bases 2, 3 made of polycarbonate and an electrochromic element 4, which makes up the dimming means, connectedly disposed between the two transparent bases 2, 3.

The electrochromic element 4 comprises a pair of transparent electrode layers 5, 6, an oxidative color-forming layer 7 and a reductive color-forming layer 8 as color-forming layers disposed between the pair of transparent electrode layers 5, 6, and an electrolyte 9 disposed between the color-forming layers 7, 8. The color means is made up of the two color-forming layers 7, 8 and the electrolyte 9. Further, a sealing material 10 made of resin is set between the transparent electrode layers 5, 6 along the side edges of the planar dimmer. One end of the lead wires 11a, 11b is connected to the transparent electrode layers 5, 6 by solders 12, on the parts in contact with the sealing material 10.

Figure 2:
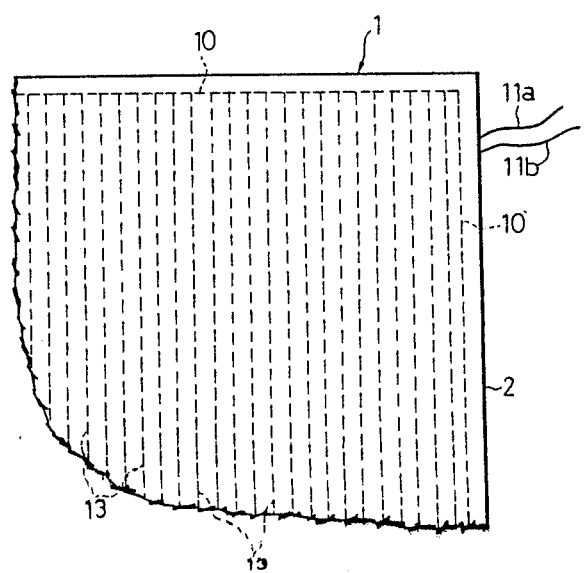

As shown in FIG. 1 and FIG. 2, a plurality of fine and long conductors 13, 14 (22 μm in diameter in this embodiment), making up the conducting means, with conductance better than that of the transparent electrode layers 5, 6, are arranged, parallel to each other, at equal intervals (1 mm in this embodiment) on the inner surface of the transparent bases 2, 3. A portion of each conductor 13, 14 is embedded in the transparent bases 2, 3 and further connected to the transparent electrode layers 5, 6. Both ends of each conductor 13, 14 are respectively electrically connected to the lead wires 11a and 11b. In this embodiment, a product of Shinetsu Polymer Co., Ltd. with the trade name POLYTECH PANEL M, which has the conductors 13, 14 already embedded in the transparent bases 2, 3, is used.

Thus, when voltage is applied on the transparent electrode layers 5, 6 and on the conductors 13, 14 via the lead wires 11a, 11b, the resistance is decreased due to the low resistances of the conductors 13, 14 and a uniform voltage is applied throughout the transparent electrodes 5, 6. Consequently, a quick redox reaction is induced between the oxidative color-forming layer 7 and the reductive color-forming layer 8, both color-forming layers, as a whole, exhibiting a rapid coloring response. As a result, the electrochromic element 4 itself exhibits quick and uniform coloring.

Further, when a voltage with reversed polarity is applied, an approximately uniform reverse voltage is applied throughout the transparent electrode layers 5, 6 through the conductors 13, 14 and the color-forming layers 7, 8, as a whole, exhibit a rapid discoloring response. As a result, the electrochromic element 4 itself quickly becomes transparent. In this embodiment, fine 22 μm conductors are used and, since they almost have no effect on visibility and transmittancy, a planar dimmer with excellent dimming qualities can be realized.

The present embodiment is not limited to the structure described above. For example, a plate made of transparent resin such as acrylic resin, polyester resin and others or an inorganic plate glass can be used for the base 2, 3. The conductors 13 on the transparent electrode layer 5 and the conductors 14 on the transparent electrode layer 6 can be arranged perpendicular to each other, or one of the transparent electrode layers 5, 6 can be an electrode made of aluminum, and others. Without departing from the spirit of the present invention, in its application, a part of its structure can be changed appropriately.

Further, since there is no impairment of visibility owing to the use of fine conductors, the present invention can also be used as an electrochromic element for displays. Moreover, iron wires, which has the effect of reinforcing the plate glass or the resin plate or preventing them from scattering when breaking, can also be used as conductors.

A second embodiment of the present invention will be described below with reference to FIG. 3 to FIG. 7.

Figure 3:
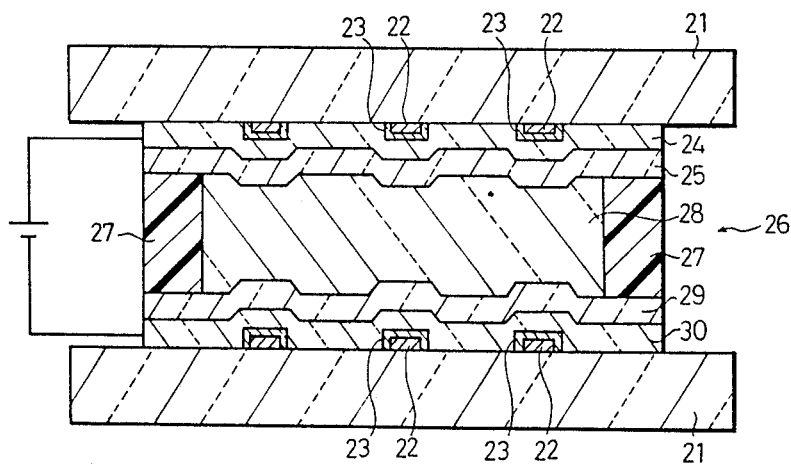
FIG. 3 is a sectional view showing the electrochromic planar dimmer of second and third embodiments of the present invention.

As shown in FIG. 3, in the electrochromic planar dimmer of this embodiment, bands of paint films 22 and metal films 23 are formed at fixed intervals on the two transparent bases 21 made of glass. Transparent electrode layers 24, 30 and an oxidative color-forming layer 25 or a reductive color-forming layer 29 are formed on both bases 21. Further, an electrolyte 28 is formed between the two color-forming layers 25, 29. Both color-forming layers 25, 29 and the electrolyte 28 make up the coloring means. Both ends of the electrolyte 28 are sealed with resin 27. The electrochromic element 26, comprising the transparent electrode layers 24, 30, the color-forming layers 25, 29, the electrolyte 28 and the resin 27, makes up the dimming means.

Plate glass or transparent heat resistant resin such as polyether sulfon, polyether ether ketone and others are used for the bases 21 mentioned above.

The paint films 22 mentioned above are formed according to the following procedure.

First, the surfaces of the bases 21 are washed with solvents such as methanol, ethanol, isopropanol and others. Then, an epoxy resin paint (bisphenol A type epoxy resin paint) mixed with palladium (Pd) and copper (Cu) is applied, by common screen printing, throughout the bases 21 in 1 mm wide long strips at equal intervals of 10 mm.

Figure 4:
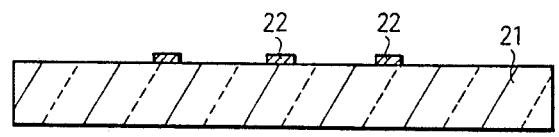
FIG. 4 is a sectional view showing the paint films after being formed on the base.

Next, the epoxy resin paint is made to harden by heating the bases 21 to about 150° to 200° C. for about thirty minutes. Then, the bases 21 are immersed in acid. For example, the bases 21 are immersed for two minutes in a 35° C., 100 ml/l aqueous solution of concentrated hydrochloric acid. Subsequently, the bases 21 are washed with water and the paint films 22 are formed on the bases 21 as shown in FIG. 4. Since the Pd and Cu mixed with the epoxy resin paint are deposited on the surface of the paint films 22, these same Pd and Cu will act as catalysts in the following process of electroless plating.

The metal films 23 are formed on the paint films 22 by an electroless plating method (chemical plating) described next.

Electroless plating is done by immersing the bases 21, with the paint films 22 formed on them, for five to seven minutes in a 40° C. nickel (Ni)-phosphorus (P) solution as described below.

| nickel | 7 ± 1 g/l |
| --- | --- |
| sodium hypophosphite | 16 ± 4 g/l |
| sodium phosphite | 120 g/l or less |

A product of Okuno Chemical Industries Co. Ltd., with the trade name TMP Electroless Nickel, is used for the electroless plating solution mentioned above.

Further, after the electroless plating method mentioned above is performed, electroplating can be performed, as desired, on the paint films 22 to improve the conductivity. Electroplating is done using metal plating materials such as nickel (Ni), copper (Cu) and others under the following conditions.

(1) Nickel plating
Components of the plating liquid:

| nickel sulfate | 250 to 350 g/l |
| --- | --- |
| nickel chloride | 35 to 50 g/l |
| boric acid | 40 to 50 g/l |
| additive | 0.5 to 1.0 ml/l |

Temperature: 55° C., pH: 4.0,
Plating time: 25 to 30 minutes,
Current density:
3 to 4 A/dm$^2$, Thickness of -continued layer: 10 μm
(2) Copper plating
Components of the plating liquid:

| | |
|---|---|
| copper sulfate | 200 to 230 g/l |
| sulfuric acid | 50 to 70 g/l |
| chlorine ions | 40 ± 10 ppm |
| additive | 3 to 5 ml/l |

Figure 5:
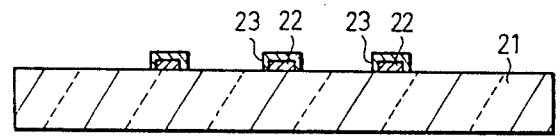
FIG. 5 is a sectional view showing the metal films after being formed on the paint films.

Temperature: 22° C., Plating time: 25 to 30 minutes,
Current density: 3 to 4 A/dm², Thickness of layer: 10 μm As shown in FIG. 5, the metal films 23, that make up the conducting means, are formed on the paint films 22 as described above.

Figure 6:
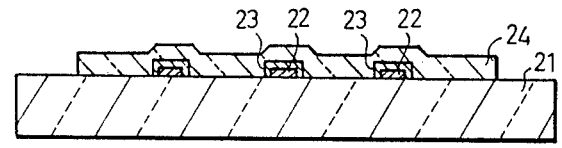
FIG. 6 is a sectional view showing a transparent electrode layer after being formed over the metal films.

Next, as shown in FIG. 6, transparent electrode layers 24 about 2000 Å thick are formed on the bases 21, by ion plating method, etc., over the previously formed paint films 22 and metal films 23.

Figure 7:
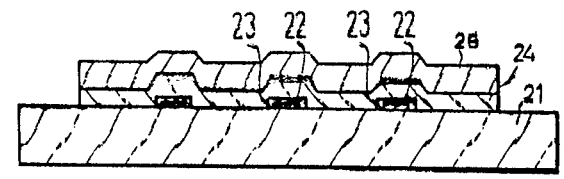
FIG. 7 is a sectional view showing a color-forming layer after being formed on the transparent electrode layer.

Further, as shown in FIG. 7, on one of the bases 21, an oxidative color-forming layer about 4000 Å thick is formed by the electrolytic polymerization of color-forming layers such as polyaniline, polypyrrole, polythiophene and others. Also, in the same manner, on the other base 21, a layer of $WO_3$ 6000 Å thick is formed by EB evaporation method. The two color-forming layers are set facing each other and between them an electrolyte is inserted, thus forming the electrochromic planar dimmer.

In the electrochromic planar dimmer of the embodiment formed as described above, the metal films 23 take the role of the lead wires, consequently the resistance is decreased, and as the conduction throughout the transparent electrode layer 24 occurs quickly and evenly, the planar dimmer as a whole colors or discolors evenly and the coloring response is rapid as well. Further, since an excessive amount of current is not supplied along the circumference of the transparent electrode layer 24, the life of the planar dimmer is longer compared to that which is not provided with metal films 23.

Next, the third embodiment is described.

The electrochromic planar dimmer of the third embodiment is similar to that of the second embodiment except for a different material for the paint films 22 and a transparent polycarbonate resin being used for the bases 21.

The paint films 22 are described next.

A component of the material used in forming the paint films 22 is an etching paint, to be etched after hardening, specifically, acrylic paint that hardens through exposure to ultraviolet radiation which is an acrylic resin that hardens through exposure to ultraviolet radiation added with rubber (for example, a product manufactured by Jujo Chemical Co., Ltd.). The materials used for the acrylic resin that hardens through exposure to ultraviolet radiation are denatured polyester acrylic resin, denatured epoxy acrylic resin and others.

First, by a screen printing method, the acrylic paint that hardens through exposure to ultraviolet radiation is applied on the bases 21 in a pattern similar to that of the second embodiment. Next, the paint is made to harden by exposure to ultraviolet radiation. The process of hardening the paint by ultraviolet radiation is done in the following manner. The bases 21 are bathed in ultraviolet radiation from a 120 W/cm high pressure mercury lamp while moving on a conveyor at a speed of 4 to 6 m/min.

Next, the hardened paint films 22 are etched. Etching is done by immersing the bases 21, for five minutes, in an etching solution containing 400 g/l of chromic acid anhydride and 380 g/l of concentrated sulfuric acid heated to 55° to 60° C. Afterwards, the bases 21 are washed with water.

Subsequently, immersion in acid is performed to denature the paint causing the pH to increase (toward neutralization). In this case, the bases 21 are immersed for thirty seconds in a 25° C., 100 ml/l concentrated hydrochloric acid aqueous solution. After the bases 21 are washed with water, a process of supplying the paint with catalysts is performed. This process of supplying the catalysts is done by immersion for ten minutes in a 40° C. liquid mixture of 80 ml/l solution of palladium chloride and stannous chloride as main components (an Okuno Chemical Industries Co., Ltd. product trade named A-30 Catalyst), and 150 ml/l concentrated hydrochloric acid. Afterwards, washing with water is performed. Finally, acid immersion is done by immersion for two minutes in a 35° C. aqueous solution of 100 ml/l concentrated hydrochloric acid.

Thus, the paint films 22, as shown in FIG. 4, are formed through the process described above. The rubber component of the acrylic paint that hardens through exposure to ultraviolet radiation is oxidized and dissolved, and the surfaces of the paint films 22 become rough and become supplied with catalysts as well. Consequently, the next process of electroless plating can be effectively performed.

The electrochromic planar dimmer obtained in this embodiment exhibits the same effect and performance as in the second embodiment described previously.

The present embodiment is not limited to the constructions described above and it may take the following modifications.

(1) Aside from Ni, the conductive material Cu can be suitably used as a plating material in the electroless plating process.

(2) The electrochromic element can be made by forming a transparent electrode layer 24 and an oxidative color-forming layer 25 (for example, iridium oxide ($IrO_x$)) as in the second and third embodiments, and on top of this, forming an insulating layer, a reductive color-forming layer 29 (for example, tungsten oxide ($WO_3$)) and an electrode layer.

(3) In the third embodiment, polycarbonate is used as a material for the base. When polymethyl metacrylate (PMMA) is used, in the hardening by ultraviolet radiation, the bases 21 are preheated for thirty seconds at 60° C. then exposed to ultraviolet rays while moving at a speed of 2 m/min. Further, etching is performed by immersion for two minutes in a 45° to 50° C. etching liquid similar to that used in the third embodiment.

(4) The stripes of metal film 23 formed by electroless plating may be arranged intersecting each other.

(5) Transparent resins such as polyester resin, vinyl chloride resin, polystyrene resin and others can be used for the base 21.

Figure 8:
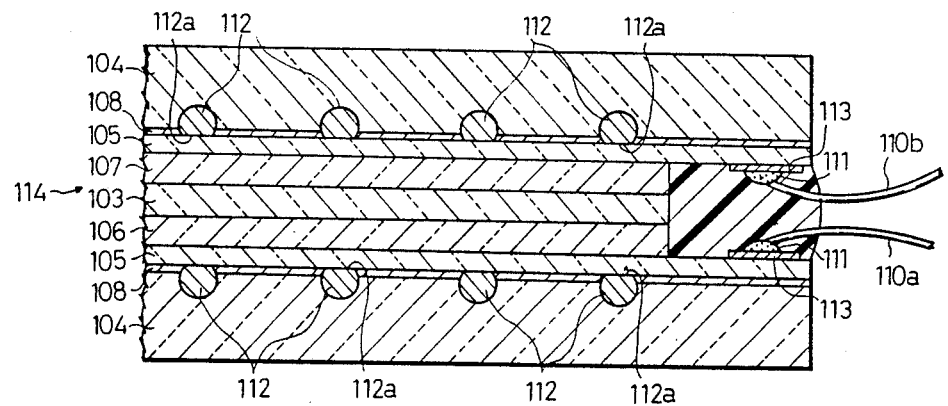
FIG. 8 is a partial horizontal sectional view of the planar dimmer of a fourth embodiment.
Figure 10A:
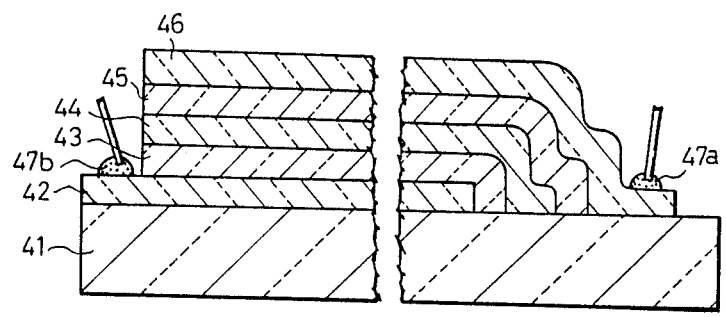
FIG. 10(a) and FIG. 10(b) show sectional views of related art.
Figure 10B:
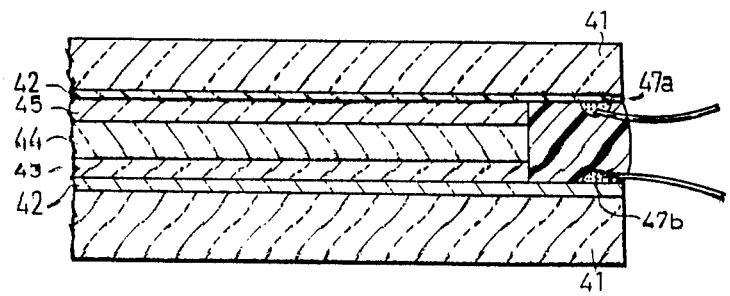

Next, a fourth embodiment of the present invention will be explained with reference to FIG. 8 and FIG. 9.

In this embodiment, a hard layer 108, made of acrylic paint that hardens through exposure to ultraviolet radiation, and making up the connecting means is disposed between the transparent base 104 of polycarbonate and the transparent electrode layer 105. An end of the lead wires 110a, 110b is connected by solders 111 via the conducting pastes 113 disposed along the circumference of the planar dimmer. A major portion of the conductors 112, having the same structure as the conductors 13, 14 in the first embodiment, is embedded lengthwise in the transparent base 114, with the jutting part cut and smoothed flush with the base, and the flat surface 112a being connected to the transparent electrode 105.

The structure of the other parts is the same as that of the first embodiment, the coloring means comprising an oxidative color-forming layer 106, a reductive color-forming layer 107, and an electrolyte 103, with the dimming means comprising the coloring means mentioned above, a transparent electrode layer 105 and sealing portion 109. In this way, the electrochromic element 114 is formed.

Figure 9A:
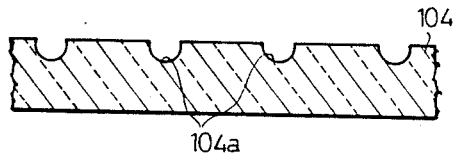
FIG. 9(a) to FIG. 9(f) show the process of manufacturing the electrochromic base.
Figure 9D:
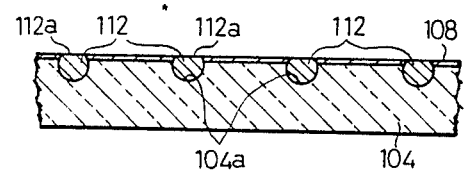
Figure 9B:
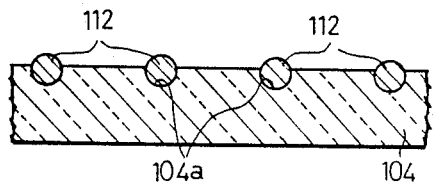

Next, to briefly describe the process of manufacturing the planar dimmer of the present embodiment with reference to FIG. 9(a) to FIG. 9(f), first, grooves 104a for embedding the conductors 112 are carved on one surface of the transparent base 104 (FIG. 9(a)), and the conductors 112 are embedded in these grooves 104a with a part of them jutting out (FIG. 9(b)).

Alternatively, without providing grooves on the transparent base 104, the conductors 112 can be glued to the base 104 with an adhesive and, in the case of a transparent base 104 made of resin that is plasticized by heating, the conductors 112 can be embedded in the transparent base 104 by thermal pressing.

Next, an acrylic paint that hardens through exposure to ultraviolet radiation is applied throughout the surface of the transparent electrode layer 105 embedded with the conductors 112, and a hard layer 108 is formed by exposure to ultraviolet radiation. Rising portions on the hard layer 108 are formed on the surface 108a of the hard layer 108 along the jutting portions of the conductors 112 (FIG. 9(c)).

The surface 108a of the hard layer 108 is ground and the exposed parts of the conductors 112 are cut to be cut surfaces 112a to make the whole surface 108a uniform (FIG. 9(d)).

Figure 9E:
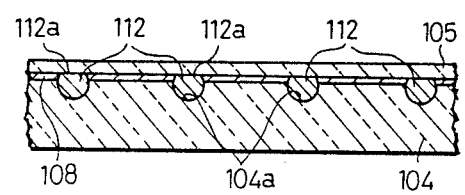
Figure 9C:
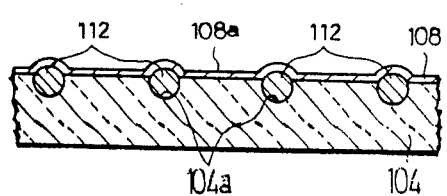
Figure 9F:
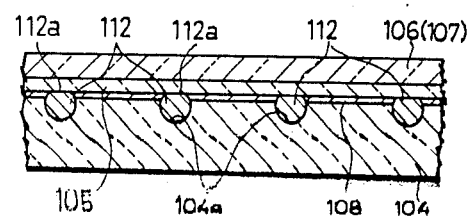

Next, a transparent electrode layer 105 is formed on the hard layer 108 (FIG. 9(e)) and, on the transparent electrode layer 105, an oxidative color-forming layer 106 or a reductive color-forming layer 107 similar to the color-forming layers 7, 8 of the first embodiment are formed (FIG. 9(f)).

Then, an electrolyte 103, similar to the electrolyte 9 of the first embodiment, is disposed between the two color-forming layers 106, 107 and the planar dimmer is formed.

In this embodiment, in addition to the effects described in the first embodiment, the following advantages are also gained.

A hard layer 108 made of acrylic paint that hardens through exposure to ultraviolet radiation is formed between the transparent base 104 provided with conductors 112 and the transparent electrode layer 105. Therefore, since the transparent electrode layer 105 is formed on the transparent base 104 with the hard layer 108 in between, the adhesiveness of the transparent electrode layer 105 to the transparent base 104 is strengthened. As a result of the reinforced connection between the transparent electrode layer 105 and the transparent base 104, the durability of the planar dimmer is improved.

This embodiment is not limited to the structure described above but can be realized with the following modifications.

(1) A base made of transparent resin such as acrylic resin, polyester resin and others can be used for the transparent base.

(2) The conductors 112 can be arranged intersecting each other on the transparent base 104.

(3) One of the transparent electrode layers 105 can be an electrode made of aluminum.

(4) Iron wires, which have the capability of reinforcing the plate glass and the resin plate and preventing scattering, can be used as conductors.

(5) Adhesives derived from silicon or thermosetting adhesives can be used for the hard layer.

(6) In the process of manufacturing the planar dimmer, an acrylic paint that hardens through exposure to ultraviolet radiation is applied on the transparent base 104, the conductors 112 are set and then exposed to ultraviolet radiation. In this case, since the exposure is performed without the conductors 112 being coated with the adhesive, grinding of the adhesive is not required.

Since it is apparent that the present invention can be realized in a wide range of constructions without departing from its essence, the realizations of the present invention are not limited to those stated in the appended claims.

What is claimed is:

1. A method of manufacturing a planar dimmer comprising the steps for:
    applying a thermosetting resin paint mixed with palladium and copper in long stripes, on a base made of glass or heat resistant transparent resin,
    hardening said paint by heating,
    immersing said hardened paint in acid,
    forming metal films on said long stripes by electroless plating,
    forming an electrode layer on said base that has said long stripes and metal films formed on it, and
    forming a color-forming layer on said electrode layer.

2. A method of manufacturing a planar dimmer, as set forth in claim 1, further including the step for performing electroplating after said electroless plating.

3. A method of manufacturing a planar dimmer comprising the steps for:
    applying an acrylic paint that hardens through exposure to ultraviolet radiation, which comprises an acrylic resin that hardens through exposure to ultraviolet radiation and rubber components, in the form of long stripes on a base made of any one of polycarbonate and polymethyl metacrylate,
    hardening said paint by exposing said base to ultraviolet radiation while moving at a fixed speed,
    etching the base, denaturing said paint to a higher pH by immersion in acid,
    supplying catalysts to said paint,
    reimmersing said paint in acid after having been supplied with catalysts,
    forming metal films on said long stripes by electroless plating,
    forming an electrode layer on said base after having said long stripes and metal films formed on it, and
    forming a color-forming layer on said electrode layer.

* * * * *